(12) United States Patent
Sullivan et al.

(10) Patent No.: US 11,956,349 B2
(45) Date of Patent: Apr. 9, 2024

(54) EFFICIENT AUTHENTIC COMMUNICATION SYSTEM AND METHOD

(71) Applicant: Visa International Service Association, San Francisco, CA (US)

(72) Inventors: Brian Sullivan, Amersham (GB);
Dinah Sloan, San Jose, CA (US);
Christian Aabye, Redwood City, CA (US); Hao Ngo, San Jose, CA (US);
Yuexi Chen, Foster City, CA (US);
Fahimeh Rezaei, Mountain View, CA (US)

(73) Assignee: Visa International Service Association, San Francisco, CA (US)

(*) Notice: Subject to any disclaimer, the term of this patent is extended or adjusted under 35 U.S.C. 154(b) by 278 days.

(21) Appl. No.: 17/288,441

(22) PCT Filed: Oct. 29, 2018

(86) PCT No.: PCT/US2018/057973
§ 371 (c)(1),
(2) Date: Apr. 23, 2021

(87) PCT Pub. No.: WO2020/091722
PCT Pub. Date: May 7, 2020

(65) Prior Publication Data
US 2021/0385075 A1  Dec. 9, 2021

(51) Int. Cl.
*H04L 9/08* (2006.01)
*H04L 9/32* (2006.01)

(52) U.S. Cl.
CPC .......... *H04L 9/0825* (2013.01); *H04L 9/0869* (2013.01); *H04L 9/3263* (2013.01)

(58) Field of Classification Search
CPC ... H04L 9/0825; H04L 9/0869; H04L 9/3263; H04L 9/0643; H04L 9/0841; H04L 9/3257; H04L 63/06; H04W 12/04
See application file for complete search history.

(56) References Cited

U.S. PATENT DOCUMENTS 8,549,300 B1 * 10/2013 Kumar ................ H04L 63/0884
713/168
8,850,208 B1 * 9/2014 Parkinson ............ H04N 21/835
709/225

(Continued)

FOREIGN PATENT DOCUMENTS

CN  101729244 A  6/2010
CN  105960776 A  9/2016

OTHER PUBLICATIONS

Application No. EP18938937.2, Extended European Search Report, dated Oct. 7, 2021, 11 pages.

(Continued)

*Primary Examiner* — Abiy Getachew
(74) *Attorney, Agent, or Firm* — Kilpatrick Townsend & Stockton LLP

(57) ABSTRACT

A method is disclosed. The method comprises transmitting, by an access device to a communication device, a resource provider certificate and an access device certificate. Then, establishing a secure channel between the access device and the communication device using data from the resource provider certificate and the access device certificate. Then, transmitting to or receiving data from the communication device using the secure channel.

18 Claims, 9 Drawing Sheets

(56) References Cited

U.S. PATENT DOCUMENTS

| | | | |
|---|---|---|---|
| 2004/0030887 A1 | 2/2004 | Harrisville-Wolff et al. | |
| 2013/0268771 A1* | 10/2013 | Blankenbeckler | G06F 21/10 |
| | | | 713/189 |
| 2014/0289130 A1 | 9/2014 | Savolainen et al. | |
| 2014/0337234 A1 | 11/2014 | Tang et al. | |
| 2015/0200774 A1 | 7/2015 | Le Saint | |
| 2015/0372811 A1 | 12/2015 | Le Saint et al. | |
| 2016/0065370 A1 | 3/2016 | Le Saint et al. | |
| 2017/0221056 A1 | 8/2017 | Karpenko et al. | |
| 2017/0228726 A1 | 8/2017 | Bohanan et al. | |
| 2017/0338965 A1* | 11/2017 | Gaddam | H04L 9/3263 |
| 2023/0097712 A1* | 3/2023 | Sullivan | H04W 76/10 |
| | | | 713/171 |

OTHER PUBLICATIONS

SG11202104170P, "Written Opinion", dated Feb. 28, 2023, 10 pages.
PCT/US2018/057973, "International Search Report and Written Opinion", dated Jul. 1, 2019, 13 pages.
CN201880099142.4, "Office Action", dated Oct. 8, 2023, 16 pages.
M. Campagna, "SEC 4: Elliptic Curve Qu-Vanstone Implicit Certificate Scheme (ECQV)," Certicom Research, Jan. 24, 2013, Version 1.0, 32 pages.
"Digital Signature Standard (DSS)," Federal Information Processing Standards Publication 186-4, Jul. 2013, 130 pages.

\* cited by examiner

EFFICIENT AUTHENTIC COMMUNICATION SYSTEM AND METHOD

CROSS-REFERENCES TO RELATED APPLICATIONS

This application is a National Stage of International Application No. PCT/US2018/057973, filed Oct. 29, 2018, of which is herein incorporated by in its entirety.

BACKGROUND

Access devices and communication devices can perform interactions with one another. Typically, the communication device will verify the authenticity of the access device prior to transmitting encrypted sensitive data to the access device. For example, the communication device can generate and send an authentication request message to the access device, and receive and process an authentication response message from the access device. Similarly, the communication device may receive and process an authentication request message from the access device, and generate and send an authentication response message to the access device.

Authenticating the access device and the communication device to one another can be a time consuming task.

Embodiments of the invention address these and other problems.

BRIEF SUMMARY

One embodiment of the invention includes a method comprising: transmitting, by an access device to a communication device, a resource provider certificate and an access device certificate; establishing a secure channel between the access device and the communication device using data from the resource provider certificate and the access device certificate; and transmitting to or receiving data from the communication device using the secure channel.

Another embodiment of the invention includes an access device comprising: a processor; a memory device; and a computer-readable medium coupled to the processor, the computer-readable medium comprising code executable by the processor for implementing a method comprising: transmitting, to a communication device, a resource provider certificate and an access device certificate; establishing a secure channel between the access device and the communication device using data from the resource provider certificate and the access device certificate; and transmitting to or receiving data from the communication device using the secure channel.

Another embodiment of the invention includes a method comprising: receiving, by a communication device from an access device, a resource provider certificate and an access device certificate; establishing a secure channel between the access device and the communication device using data from the resource provider certificate and the access device certificate; and transmitting to or receiving data from the access device using the secure channel.

Another embodiment of the invention includes a communication device comprising: a processor; a memory device; and a computer-readable medium coupled to the processor, the computer-readable medium comprising code executable by the processor for implementing a method comprising: receiving, from an access device, a resource provider certificate and an access device certificate; establishing a secure channel between the access device and the communication device using data from the resource provider certificate and the access device certificate; and transmitting to or receiving data from the access device using the secure channel.

Another embodiment of the invention includes a method comprising: transmitting, by a resource provider computer to a certificate authority computer, certificate request values; receiving, by the resource provider computer from a certificate authority computer, a resource provider certificate; creating, by the resource provider computer, an access device certificate; and transmitting, by the resource provider computer to an access device, the access device certificate and the resource provider certificate.

Another embodiment of the invention includes a resource provider computer comprising: a processor; a memory device; and a computer-readable medium coupled to the processor, the computer-readable medium comprising code executable by the processor for implementing a method comprising: transmitting, to a certificate authority computer, certificate request values; receiving, from a certificate authority computer, a resource provider certificate; creating an access device certificate; and transmitting, to an access device, the access device certificate and the resource provider certificate.

These and other embodiments of the invention are described in further detail below.

DETAILED DESCRIPTION

Figure 1:
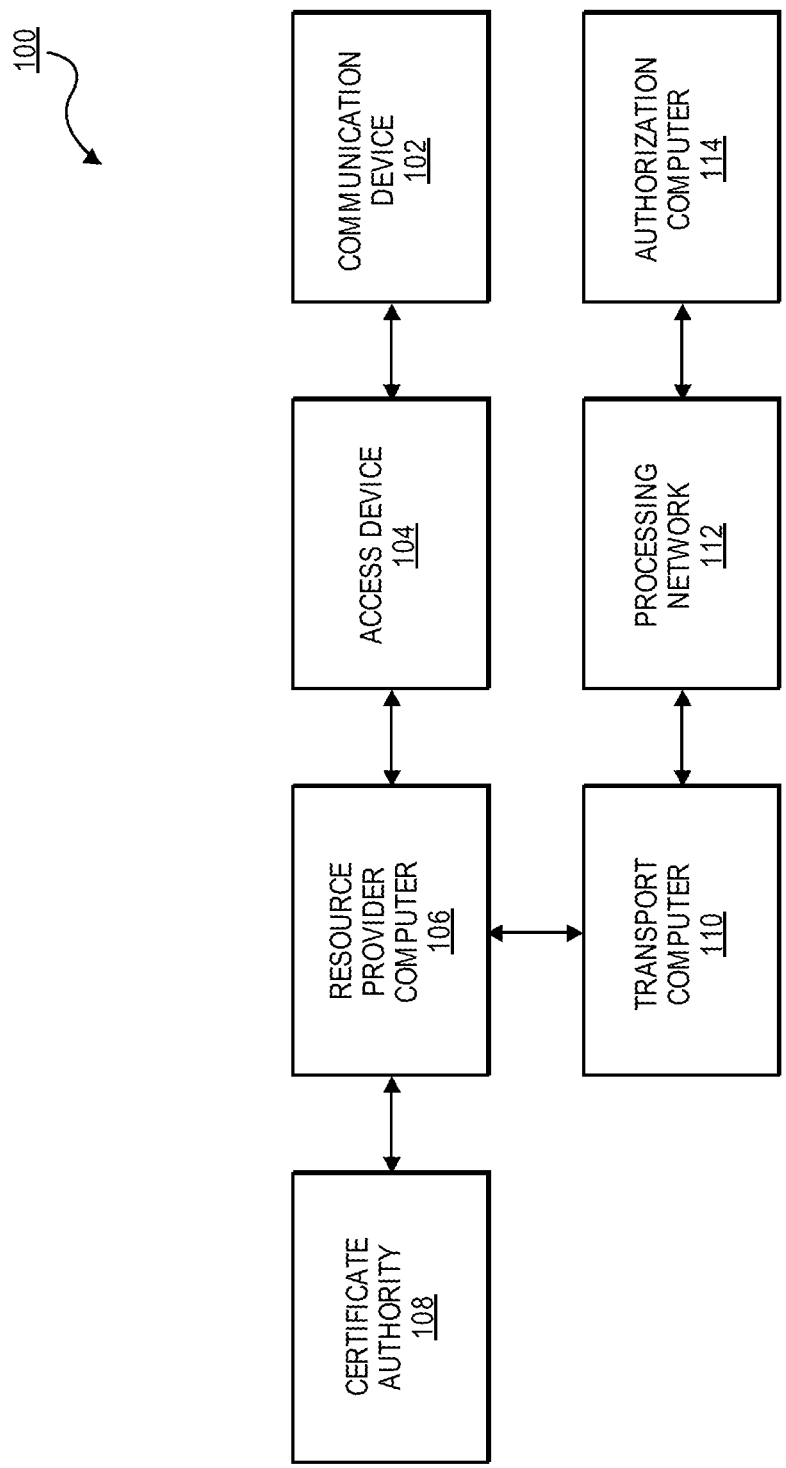
FIG. 1 shows a block diagram of a system according to embodiments of the invention.

Prior to discussing embodiments of the invention, some terms will be described.

A "user" may include an individual. In some embodiments, a user may be associated with one or more personal accounts and/or communication devices. The user may also be referred to as a cardholder, account holder, or consumer in some embodiments.

A "communication device" may comprise any suitable electronic device that may be operated by a user, which may also provide remote communication capabilities to a network. A "mobile communication device" may be an example of a "communication device" that can be easily transported. Examples of remote communication capabilities include using a mobile phone (wireless) network, wireless data network (e.g., 3G, 4G or similar networks), Wi-Fi, Wi-Max, Bluetooth, Bluetooth low energy (BLE), or any other communication medium that may provide access to a network such as the Internet or a private network. Examples of mobile communication devices include mobile phones (e.g. cellular phones), personal digital assistants (PDAs), tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities. In some embodiments, a mobile communication device can function as a payment device (e.g., a mobile communication device can store and be able to transmit payment credentials for a transaction).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a user. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

"Access data" may include account information, or any other suitable type of data that can be used to access a resource such as data, goods, services, etc. Access data may be specifically associated with a user or a set of users, and may be in any suitable form.

"Account information" may include any information associated with a user's account. Such information may be directly related to the account or may be derived from information related to the account. Examples of account information may include an account identifier, a username, a password, user information (e.g., name, age, email address, shipping address, etc.). In some cases, account information may also be known as payment account information, card account information, or the like, and may be associated with a payment device (e.g., payment card). For example, account information may include a PAN (Primary Account Number or "account number"), user name, expiration date, CVV (Card Verification Value), dCVV (Dynamic Card Verification Value), CVV2 (Card Verification Value 2), CVC3 (Card Verification Code 3) card verification values, etc. CVV2 is generally understood to be a static verification value associated with a payment device. CVV2 values are generally visible to a user (e.g., a user), whereas CVV and dCVV values are typically embedded in memory or authorization request messages and are not readily known to the user (although they are known to the issuer and payment processors).

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g., a payment account and/or payment device associated with the account). Such information may be directly related to the account or may be derived from information related to the account. Examples of account information may include a PAN (primary account number or "account number"), user name, expiration date, and verification values such as CVV, dCVV, CVV2, dCVV2, and CVC3 values.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

A "resource provider" may be an entity that can provide a resource such as goods, services, information, and/or access. Examples of resource providers includes merchants, data providers, transit agencies, governmental entities, venue and dwelling operators, etc. A resource provider may operate a resource provider computer. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc.

An "issuer" may typically include a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), entry and/or exit gates for transit systems, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or payment device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal. In some embodiments, one or more access devices may be associated with a resource provider computer.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include a machine that processes something. In some embodiments, a processor may be any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "secure element" can include an element that is secure. In some embodiments, a secure element can include a component that can perform a function securely. A secure element may be a memory that securely stores data, such that its access is protected. An example of a "secure element" is a Trusted Execution Environment (TEE), a secure area of a processor. Another example of a secure element is a Universal integrated-circuit card (UICC), a secure smart card. Yet another example of a secure element is an embedded secure element, an embedded hardware component in a larger mechanical or electrical system. Another example of a secure element is a hardware security module (HSM), which is a physical computing device that can safeguard and manage cryptographic keys for authentication and provide crypto-processing functions.

An "interaction" may be a reciprocal action or influence. Examples of interactions may include transactions such as payment transactions, data access transactions, and secure location access transactions.

The term "public/private key pair" may include a pair of linked cryptographic keys generated by an entity. The public key may be used for functions such as encrypting a message to send to the entity or for verifying a digital signature which was supposedly made by the entity. The private key, on the other hand may be used for functions such as decrypting a received message or applying a digital signature. The public key can be authorized by a body known as a Certificate Authority (CA) which can store the public key in a database and distributes it to any other entity which requests it. The private key can be kept in a secure storage medium and will usually only be known to the entity. However, the cryptographic systems described herein may feature key recovery mechanisms for recovering lost keys and avoiding data loss. Public and private keys may be in any suitable format, including those based on Rivest-Shamir-Adleman (RSA) or elliptic curve cryptography (ECC).

An "elliptic curve cryptography point" or "ECC point" can include a point along an elliptic curve. An ECC point can include any point on an elliptic curve suitable for elliptic curve cryptography.

A "digital signature" may include a type of electronic signature. A digital signature may encrypt documents with digital codes that can be difficult to duplicate. In some embodiments, a digital signature may refer to the result of applying an algorithm based on a public/private key pair, which allows a signing party to manifest, and a verifying party to verify, the authenticity and integrity of a document. The signing party acts by means of the private key and the verifying party acts by means of the public key. This process certifies the authenticity of the sender, the integrity of the signed document and the so-called principle of nonrepudiation, which does not allow disowning what has been signed. A certificate or other data that includes a digital signature by a signing party is said to be "signed" by the signing party.

A "certificate" or "digital certificate" may include an electronic document and/or data file. In some embodiments, a digital certificate may use a digital signature to bind a public key with data associated with an identity. A digital certificate may be used to prove the ownership of a public key. The certificate may include one or more data fields, such as the legal name of the identity, a serial number of the certificate, a valid-from and valid-to date for the certificate, certificate related permissions, etc. A certificate may contain a "valid-from" date indicating the first date the certificate is valid, and a "valid-to" date indicating the last date the certificate is valid. A certificate may also contain a hash of the data in the certificate including the data fields. Unless otherwise noted, each certificate is signed by a certificate authority.

A "certificate authority" (CA) may include an entity that issues digital certificates. A CA may prove its identity using a CA certificate, which includes the CA's public key. A CA certificate may be signed by another CA's private key, or may be signed by the same CA's private key. The latter is known as a self-signed certificate. The CA may maintain a database of all certificates issued by the CA, and may also maintain a list of revoked certificates. The CA may be operated by an entity, for example, a processing network entity, an issuer, an acquirer, etc.

A "cryptographic nonce" or "nonce" may include an arbitrary number. In some embodiments, a nonce may be any number, string, bit sequence, or other data value intended to be used in association with a single communication session. In some cases, a cryptographic nonce may be randomly or pseudo-randomly generated. Typically, a cryptographic nonce is of sufficient length as to make insignificant the likelihood of independently generating the same nonce value multiple times.

A "blinded key," such as a "blinded public key" may include a key that has been obfuscated or otherwise modified from its original value. In some embodiments, a blinded key may be blinded by combination of its original value with another data element, such as a cryptographic nonce. For example, in elliptic curve cryptography, a public key may be multiplied by a nonce to generate a "blinded public key." Similarly, a private key may be multiplied by a nonce to generate a "blinded private key." In this context, a cryptographic nonce may be referred to as a blinding factor.

An "ephemeral key pair" may include an ephemeral public key and an ephemeral private key. In some embodiments, an ephemeral key pair may be generated for use with a single communication session and/or transaction. The ephemeral key pair may be of any suitable format, such as ECC or RSA. Typically, an ephemeral key pair may be deleted once the interaction or communication session has concluded.

A "static key pair" may include a static public key and a static private key. In some embodiments, a static key pair may be maintained over a period of time. Typically, though not necessarily, a static private key may be stored securely, such as in a hardware security module (HSM) or secure element (SE). Typically, though not necessarily, a static public key may be bound to an identity through the use of a digital certificate. The static key pair may be of any suitable format, such as ECC or RSA.

A "shared secret" may include any data value or other information known only to authorized parties in a secure communication. A shared secret can be generated in any suitable manner, from any suitable data. For example, a Diffie-Hellman based algorithm, such as Elliptic-Curve Diffie-Hellman (ECDH) may be used to generate a shared secret from a private key and a public key. In some cases, a shared secret may be used to generate a session key. In some embodiments, additional values and/or data may be used along with the public key and the private key to generate a session key. For example, the additional values can include blinding factors, unpredictable numbers, etc.

A "session key" may include a cryptographic key used in a session. In some embodiments, a session key may be used to encrypt or decrypt data to be securely communicated. In some cases, a session key may be generated from a shared secret known both to a sending entity and a receiving entity. For example, a session key may be derived using a key derivation function and a shared secret. A session key can be used to protect data included in a request or response message. In some embodiments, a session key may be part of a symmetric key pair.

A "key derivation function" (KDF) may include a function capable of deriving keys. In some embodiments, a key derivation function can be capable of deriving one or more secret keys from a secret value. For example, a key derivation function may derive a session key from various inputs, such as, but not limited to, random values, unpredictable numbers, public keys, and/or private keys. Keyed cryptographic hash functions are examples of pseudorandom functions used for key derivation.

Embodiments of the invention allow for efficient methods for authenticated communication. For example, a communication device and an access device can mutually authenticate while exchanging messages comprising sensitive data without exposing any sensitive data in cleartext.

Embodiments of the invention allow for authentication whereby a terminal (i.e., access device) is not explicitly authenticated. Rather, methods according to embodiments of the invention use techniques with which a terminal can supply certificates to a communication device, and the communication device can establish a secure channel to the terminal using these certificates. In some embodiments, a method used to extract public keys from certificates can allow for a terminal to establish a terminal end of a secure channel with a communication device, when the terminal's certificates are certified by the same certificate authority that certified the communication device's certificates.

Once the secure channel is established, any data communicated from the terminal to the communication device, or from the communication device to the terminal, can be considered to be verified as originating from a trusted entity.

Embodiments of the invention can allow for ECQV certificates, see (M. Campagna "*Standards for efficient cryptography, SEC* 4: *Elliptic Curve Qu-Vanstone Implicit Certificate Scheme (ECQV)*", Certicom Research, 2013) which is incorporated herein by reference for all purposes in its entirety. ECQV can enable compact certificates, thus enabling the necessary data to be communicated from the terminal to the communication device within existing protocols. Also, less in-communication device processing is needed than with alternative signature schemes such as elliptic curve digital signature algorithm (EC-DSA) or EC-Schnorr (e.g., ECQV uses 1×ECC point multiplication per certificate, the alternatives listed use 2×ECC point multiplications per certificate).

Embodiments of the invention allow for the access device to send a static representation of its public key in a certificate to a communication device, rather than determining a new ephemeral public key for each interaction with communication device. Embodiments of the invention can allow the access device to provide an ephemeral value to the communication device, such as a random value s, as described in further detail herein. The random value s can be used by the communication device as input to derive a session key that can be used to securely communicate with the access device. The use of the random value s and the access device (static) public key, included in a certificate, can allow for randomness between session and/or communications without using a new ephemeral access device public key for each session and/or communication. The processing impact of the random value s can be negligible.

In other words, instead of using an ephemeral public key from the access device for its session key derivation, the communication device can extract a static resource provider public key and a static access device public key from received ECQV certificates. The communication device can then use the access device public key in conjunction with the random value s in the session key derivation.

In some embodiments, a session key established by an access device can only be derived by an access device that has an access device public key and access device certificate from the same root certificate authority as the communication device. Due to this, the access device may not be explicitly authenticated, instead the communication device can encrypt data that can only be successfully decrypted by a genuine access device. This can provide confidentiality (including privacy protection) & integrity. In some embodiments, this can further protect against manipulation of processing options data object list (PDOL) data from the access device (e.g., if the access device indicates to the communication device that cardholder verification is required, a malicious party cannot manipulate the indication).

FIG. 1 shows a block diagram of a system 100 comprising a number of components according to some embodiments of the invention. The system 100 comprises a communication device 102, an access device 104, a resource provider computer 106, a certificate authority 108, a transport computer 110, a processing network 112, and an authorization computer 114. The communication device 102 may be in operative communication with the access device 104. The resource provider computer 106 may be in operative communication with the access device 104, the certificate authority 108, and the transport computer 110. The transport computer 110 may be in operative communication with the processing network 112, which may be in operative communication with the authorization computer 114. FIG. 1 is intended to illustrate an example arrangement of components according to some embodiments of the invention, and is not intended to be limiting.

The entities, providers, networks, and devices illustrated in FIG. 1 can communicate with one another via any appropriate means, including a communications network. Messages and other communications between the entities, providers, networks, and devices may be in encrypted or unencrypted form. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as but not limited to a Wireless Application Protocol (WAP), I-mode, and/or the like); and/or the like. Messages between the devices and computers may be transmitted using a secure communications protocol such as, but not limited to, File Transfer Protocol (FTP); Hypertext transfer Protocol (HTTP); Secure Hypertext Transfer Protocol (HTTPS), Secure Socket Layer (SSL), Transport Layer Security (TLS) and/or the like.

A user may conduct an interaction at a resource provider (e.g., a merchant) using a communication device 102. The interaction may be a payment transaction (e.g., for the purchase of a good or service), an access interaction (e.g., for access to a transit system), or any other suitable interaction. The communication device 102 can interact with an access device 104 at a resource provider location, the resource provider operating a resource provider computer 106. For example, the user may tap the communication device 102 against an near-field communication (NFC) reader in the access device 104. Alternately, the user may indicate payment account information to the resource provider electronically, such as in an online transaction. In some cases, the communication device 102 may transmit, to the access device 104, an account identifier, such as a primary account number or a payment token.

The resource provider computer 106 may be in operative communication with one or more access device. For example, the resource provider of the resource provider computer 106 may operate a location that includes and/or operates multiple access devices. The resource provider computer 106 may be capable of providing access device public key certificates as well as access device key pairs for each of the access devices in communication with the resource provider computer 106.

The certificate authority 108 may include one or more server computers. The certificate authority 108 may be capable of issuing certificates to entities, such as resource providers, issuers, communication devices, etc. The certificate authority 108 may be capable of generating a CA key pair. The certificate authority 108 may also be capable of generating resource provider public key certificates. In some embodiments, the certificate authority 108 may be in operative communication with and/or operatively coupled to the processing network 112, and may generate certificates on behalf of the processing network 112.

The transport computer 110 can be located between (in an operational sense) the resource provider computer 106 and the processing network 112. The transport computer 110 may be operated by an entity such as an acquirer. The acquirer can maintain an account of any merchants (e.g., an airline) with which users may wish to interact. The transport computer 110 may be configured to route messages between any suitable number of resource provider computers and any suitable number of processing networks. In some embodiments, the transport computer 110 can store and/or make use of suitable routing tables.

The processing network 112 may route or switch messages between a number of transport computers including the transport computer 110, and a number of authorizing entity computers including the authorization computer 114. The processing network 112 may be a network computer in some embodiments. The network computer may be configured to provide authorization services, and clearing and settlement services for payment transactions. A network computer may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may include a server computer and may use any suitable wired or wireless telecommunications network, including the Internet. In some embodiments, the network computer may forward an authorization request received from a transport computer to the authorizing entity computer via a communication channel. The network computer may further forward an authorization response message received from the authorizing entity computer to the transport computer.

The authorization computer 114 may be configured to authorize any suitable request, including access to data, access to a location, approval for an interaction, and/or approval for a payment. In some embodiments, the authorization computer 114 may be operated by an account issuer. Typically, the issuer is an entity (e.g., a bank) that issues and maintains an account of a user. The account may be a credit, debit, prepaid, or any other type of account.

Figure 2:
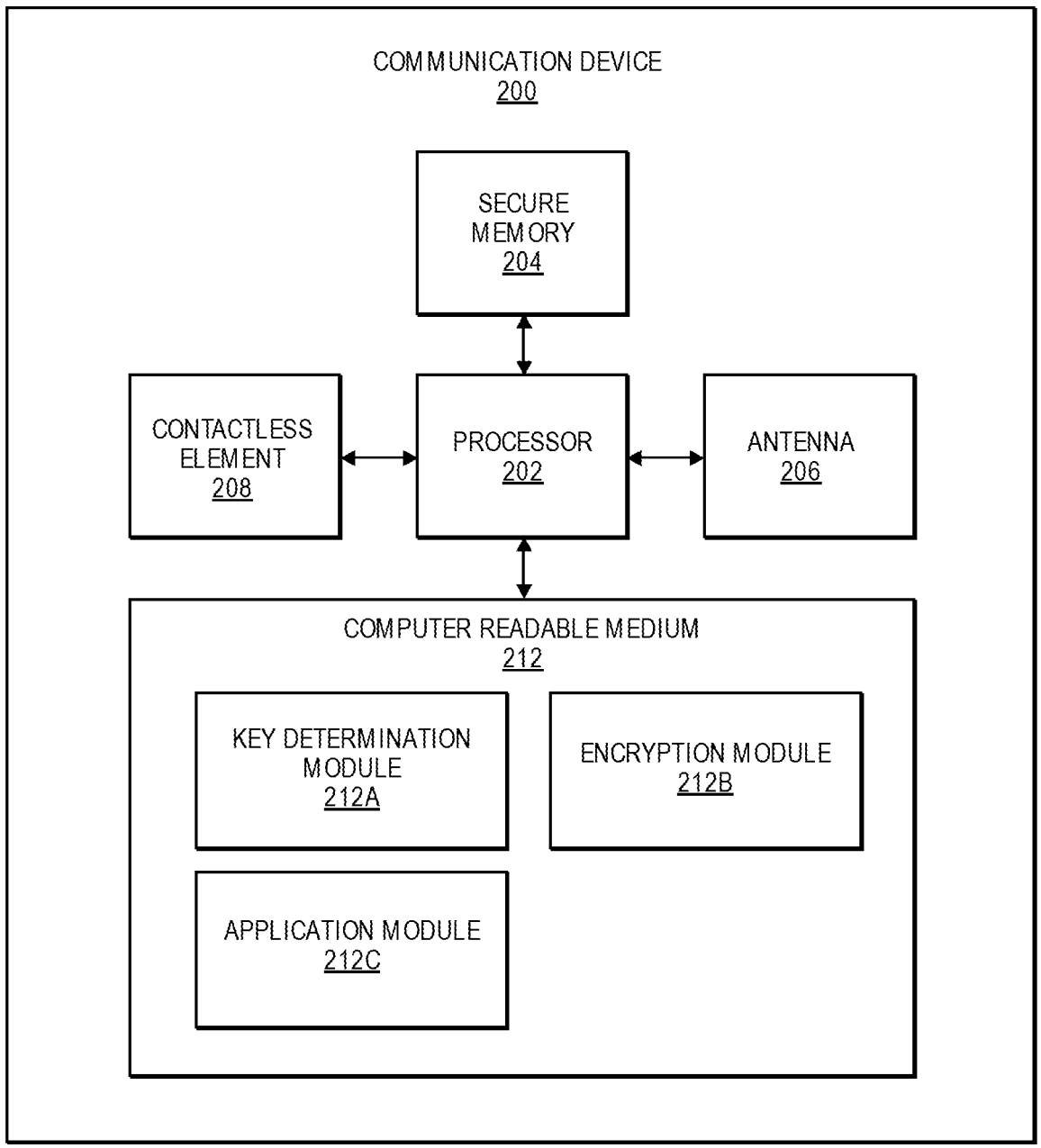
FIG. 2 shows a block diagram illustrating a communication device according to embodiments of the invention.

FIG. 2 shows a block diagram of a communication device 200 according to some embodiments of the invention. The exemplary communication device 200 may comprise a processor 202. The processor 202 may be coupled to a secure memory 204, an antenna 206, a contactless element 208, and a computer readable medium 212 comprising a key determination module 212A, an encryption module 212B, and an application module 212C.

The secure memory 204 may store encrypted access data, key identifiers, public keys, and/or any other relevant data securely. The secure memory 204 may be in the form of a secure element, a hardware security module, or any other suitable form of secure data storage.

The antenna 206 may be a long range antenna that allows the communication device 200 to communicate with a remote computers via a network such as a cellular network.

The contactless element 208 may include a short range antenna and one or more computer chips. The contactless element 208 may allow the communication device 200 to communicate with an access device via a short range communication mode such as NFC, Bluetooth, or Wi-Fi.

The computer readable medium 212 may comprise code, executable by the processor 202, to implement a method comprising: receiving, by a communication device from an access device, a resource provider certificate and an access device certificate; establishing a secure channel between the access device and the communication device using data from the resource provider certificate and the access device certificate; and transmitting to or receiving data from the access device using the secure channel.

The key determination module 212A may include any program, software, or other code suitable to perform operations related to determining encryption keys using data in certificates. The key determination module 212A may determine an encryption key using data in a certificate in any suitable manner described herein. In some embodiments, the key determination module 212A can be configured to determine a resource provider public key using data in a resource provider public key certificate and a certificate authority public key. The key determination module 212A can also be configured to determine an access device public key using data in an access device certificate and the resource provider public key.

The encryption module 212B may include any program, software, or other code suitable to perform operations related to encryption and/or decryption. For example, the encryption module 212B may be configured to generate a shared secret, as described herein, such as using a key agreement protocol such as Diffie-Hellman. The encryption module 212B may be further configured to derive a session key from a shared secret, such as using a key derivation function (KDF). In some embodiments, the encryption module 212B may be configured to store one or more static keys, such as a static communication device private key and/or a static communication device public key. In some embodiments, encryption module 212B may be implemented using any combination of software (such as host card emulation or HCE) and hardware (such as a hardware security module or HSM). The session key, as described herein, may be used to encrypt data (e.g., access data) to send to an access device. The session key may also be used to decrypt data received from an access device. The access device may only be able to decrypt the data if the access device is authentic, thus implicitly authenticating the access device.

The application module 212C may include any program, software, or other code suitable to run one or more applications. For example, the application module 212C may include a payment application operable to conduct a payment transaction. In some embodiments, the payment application may be configured to allow a user to select goods and services to be purchased, obtain secure credentials (e.g., a cryptogram key) from an issuer of a payment account, and/or initiate or conduct a payment transaction (e.g., using the secure credentials). It is understood that the components described herein are for illustration purposes only and not intended to be limiting. In various embodiments, more or less components than listed herein may be provided.

Figure 3:
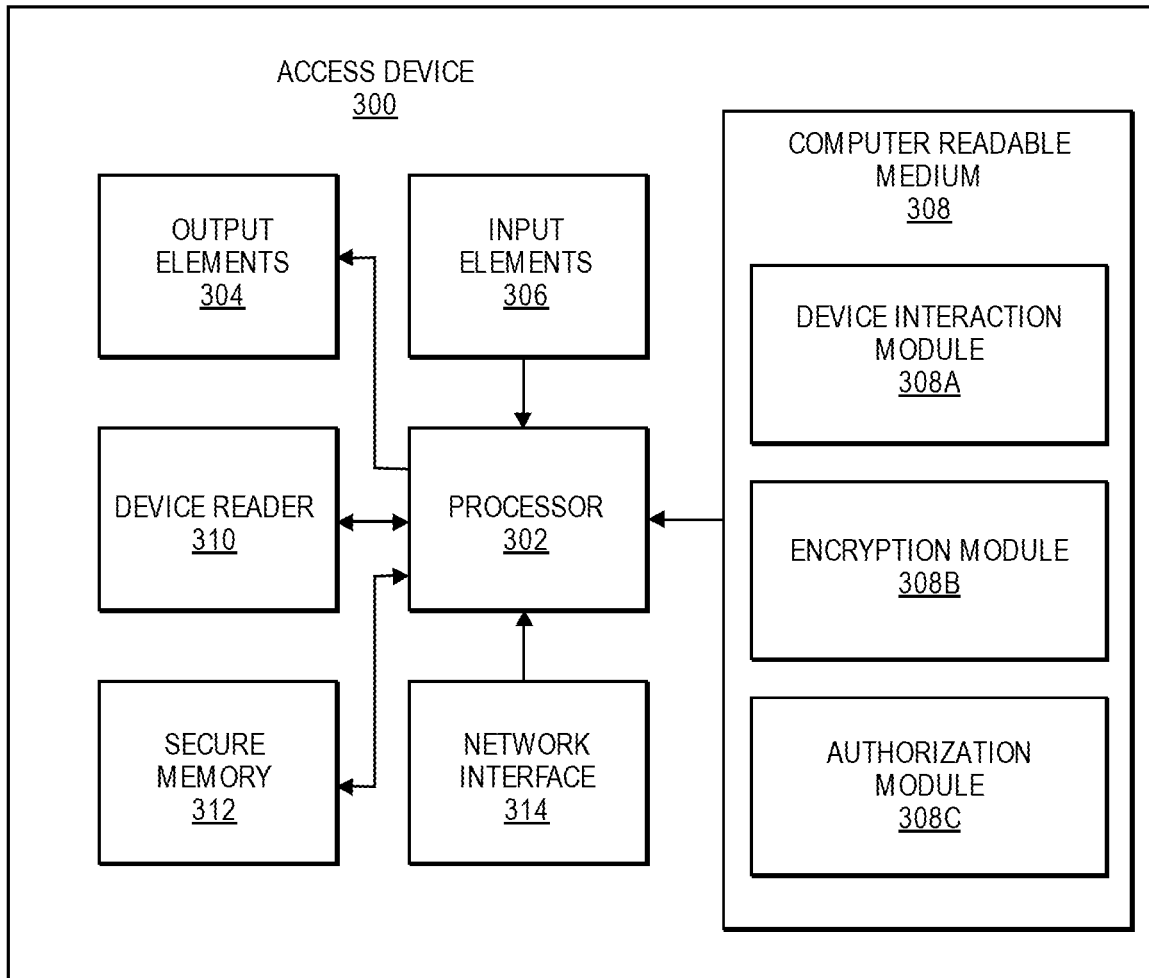
FIG. 3 shows a block diagram illustrating an access device according to embodiments of the invention.

FIG. 3 shows a block diagram of an access device 300 according to some embodiments of the invention. The exemplary access device 300 may comprise a processor 302, output elements 304, input elements 306, a computer readable medium 308, a device reader 310, a secure memory 312, and a network interface 314. The computer readable medium 308 can comprise a device interaction module 308A, an encryption module 308B, and an authorization module 308C.

The one or more output elements 304 may comprise any suitable device(s) that may output data. Examples of output elements 304 may include display screens, speakers, and data transmission devices.

The one or more input elements 306 may include any suitable device(s) capable of inputting data into the access device 300. Examples of input devices include buttons, touchscreens, touch pads, microphones, etc.

The device reader 310 may comprise any suitable device capable of reading data from a communication device such as an access card (e.g., a credit card). The device reader 310 include antennas, electrical contacts, etc., and can read data on memory chips or magnetic stripes on portable device such as cards.

The computer readable medium 308 may comprise code, executable by the processor 302, to implement a method comprising: transmitting, by an access device to a communication device, a resource provider certificate and an access device certificate; establishing a secure channel between the access device and the communication device using data from the resource provider certificate and the access device certificate; and transmitting to or receiving data from the communication device using the secure channel.

The device interaction module 308A may comprise computer code, executable by the processor 302 to allow the access device 300 to communicate with an external device such as a communication device.

The encryption module 308B may include any program, software, or other code suitable to perform operations related to encryption and/or decryption. For example, the encryption module 308B may be configured to generate a shared secret, as described herein, such as using a key agreement protocol such as Diffie-Hellman. The encryption module 308B may be further configured to derive a session key from a shared secret, such as using a key derivation function (KDF). In some embodiments, the encryption module 308B may be configured to store one or more static keys, such as a static access device private key and/or a static access device public key. In some embodiments, encryption module 308B may be implemented using any combination of software (such as host card emulation or HCE) and hardware (such as a hardware security module or HSM). The session key, as described herein, may be used to encrypt and/or decrypt data.

The authorization module 308C may comprise computer code, executable by the processor 302 to generate and transmit authorization request messages and receive authorization response messages from an authorization computer.

The secure memory 312 may store encrypted access data, key identifiers, public keys, and any other relevant data securely. The secure memory 312 may be in the form of a secure element, a hardware security module, or any other suitable form of secure data storage.

The network interface 314 may include an interface that can allow the access device 300 to communicate with external computers. Network interface 314 may enable the access device 300 to communicate data to and from another device (e.g., resource provider computer, communication devices, etc.). Some examples of network interface 314 may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by network interface 314 may include Wi-Fi™.

Data transferred via network interface 314 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 314 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 4:
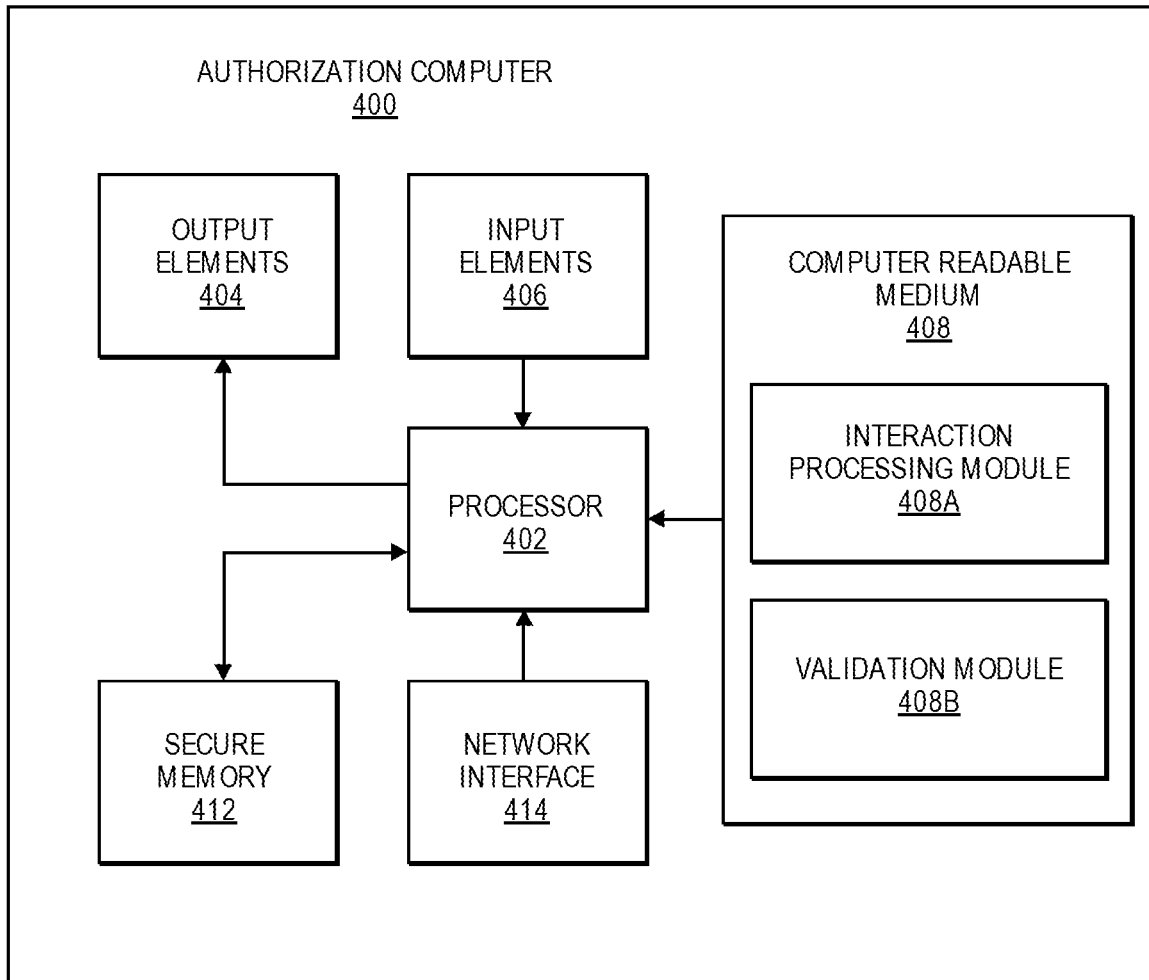
FIG. 4 shows a block diagram illustrating an authorization computer according to embodiments of the invention.

FIG. 4 shows a block diagram of an authorization computer 400 according to some embodiments of the invention. The exemplary authorization computer 400 may comprise a processor 402, output elements 404, input elements 406, a computer readable medium 408, a secure memory 412, and a network interface 414. The computer readable medium 408 can comprise an interaction processing module 408A and a validation module 408B.

The one or more output elements 404 may comprise any suitable device(s) that may output data. The output elements 404 may be similar to the output elements 304 described above. The one or more input elements 406 may be similar to the input elements 306 described above.

The computer readable medium 408 may comprise code, executable by the processor 402. The computer readable medium 408 may contain any number of applications, modules, and code.

The interaction processing module 408A may include code, executable by the processor 402 to process access data, such as transaction data. Such processing may include performing fraud analyses and determining if authorization request messages should be approved or declined.

The secure memory 412 may store encrypted access data, key identifiers, public keys, and any other relevant data securely. The secure memory 412 may be similar to the secure memory 312 described above. The network interface 414 may include an interface that can allow the authorization computer 400 to communicate with external computers. The network interface 414 may be similar to the network interface 314 described above.

Figure 5:
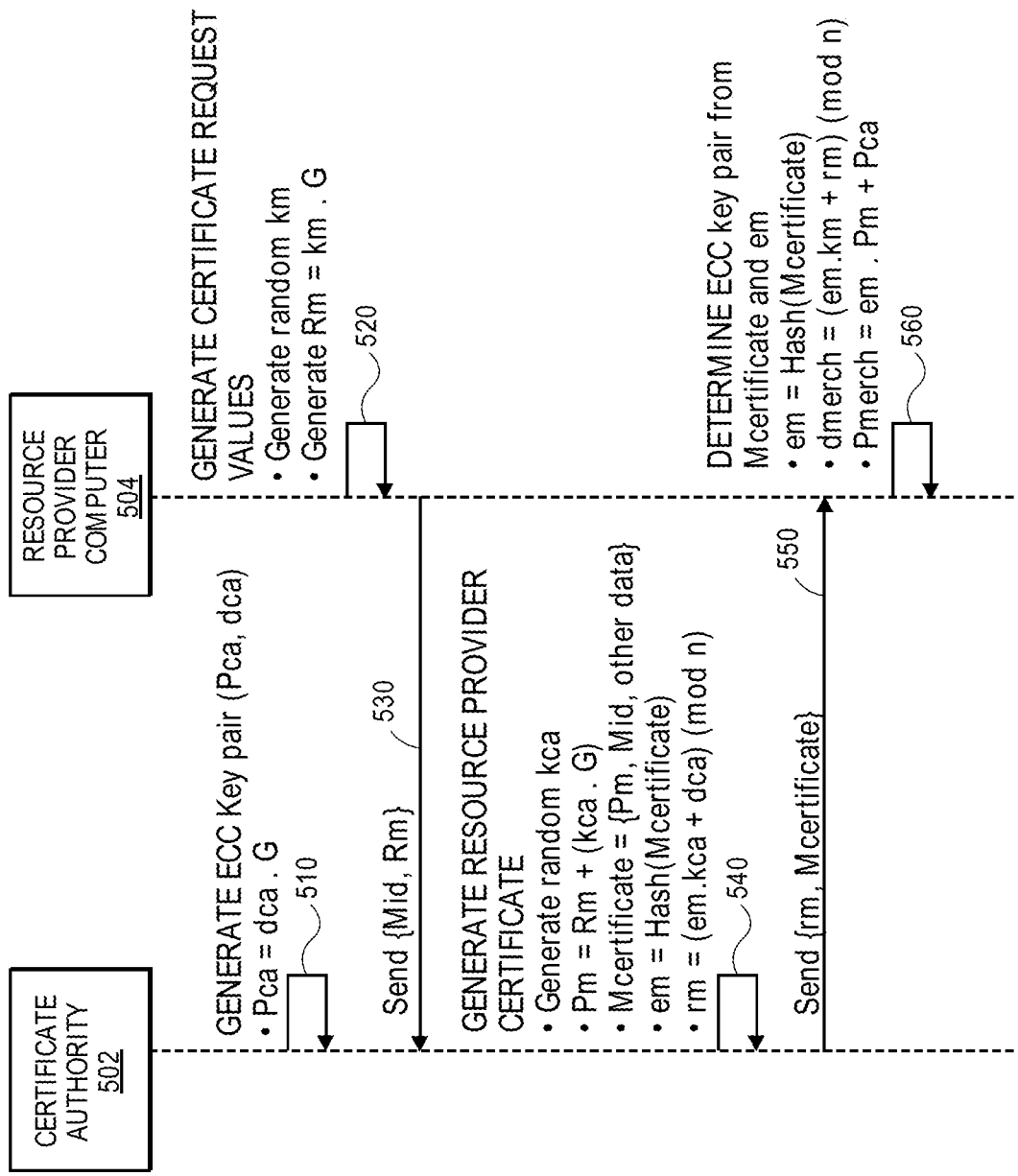
FIG. 5 shows a flow diagram illustrating a resource provider certificate and key pair generation process according to embodiments of the invention.

FIG. 5 shows a flowchart of a resource provider key and certificate generation method according to an embodiment of the invention. The method illustrated in FIG. 5 will be described in the context of a resource provider computer communicating with a certificate authority to generate a resource provider key pair as well as a resource provider public key certificate. It is understood, however, that the invention can be applied to other circumstances (e.g., a server computer requesting a certificate, etc.). Although the steps are illustrated in a specific order, it is understood that embodiments of the invention may include methods that have the steps in different orders. In addition, steps may be omitted or added and may still be within embodiments of the invention.

The method described in FIG. 5 may use an elliptic curve Qu-Vanstone (ECQV) implicit certificate scheme, see (M. Campagna "*Standards for efficient cryptography, SEC 4: Elliptic Curve Qu-Vanstone Implicit Certificate Scheme (ECQV)*", Certicom Research, 2013), with a second generation secure channel. Note that the ECQV certificate scheme, as described herein, saves 64 bytes compared to other certificate schemes.

At step 510, a certificate authority 502 can generate a certificate authority ECC key pair, also referred to as a CA key pair. The CA key pair can comprise a certificate authority private key dca and a certificate authority public key Pca. The certificate authority 502 can generate the CA key pair at any suitable time prior to step 520 and can be performed independently of other devices, such as a resource provider computer 504. The certificate authority 502 can store the CA key pair in a secure memory or other suitable database.

For example, the certificate authority 502 can determine the private key using any suitable method as know by one of skill in the art. The certificate authority 502 can determine the certificate authority public key Pca based on the certificate authority private key dca and a generator point G. The generator point G can be a generator point of P-256 Elliptic Curve, as described in [C. F. Kerry, "Digital signature standard (DSS)," National Institute of Standards and Technology, 2013.], however, it is understood that other generator points may be used. The certificate authority 502 can compute Pca=dca.G. The "dot" notation (i.e., ".") can represent ECC point multiplication. Elliptic curve point multiplication can include an operation of successively adding a point along an elliptic curve to itself repeatedly. In some embodiments, elliptic curve point multiplication can be referred to as elliptic curve scalar multiplication and may be written in a Hessian form of an elliptic curve.

In some embodiments, the certificate authority 502 can make the certificate authority public key Pca available to other computers. In some embodiments, the resource provider computer 504 may retrieve the certificate authority public key Pca from the certificate authority 502 after step 510 and before step 560. For example, the resource provider computer 504 can transmit a request for the certificate authority public key Pca and/or a CA certificate to the certificate authority 502. The certificate authority 502 can respond by transmitting the certificate authority public key Pca and/or the CA certificate to the resource provider computer 504.

At step 520, the resource provider computer 504 can generate certificate request values, also referred to as resource provider certificate request values. The resource provider certificate request values can comprise a first ECC point Rm and a merchant identifier Mid, also referred to as a resource provider identifier. The resource provider computer 504 can determine the first ECC point Rm based on a first random value km. The resource provider computer 504 can generate the first random value km in any suitable manner, for example, using random and/or pseudorandom number generator(s). The first random value km can have any suitable length, such as the order of the elliptic curve base point (i.e., 265 bits for curve P-256). The resource provider identifier Mid may be any suitable identifier. For example, the resource provider identifier Mid can be a string of alphanumeric characters.

The resource provider computer 504 can determine the first ECC point Rm based on the first random value km as well as a generator point G. The generator point G can be a generator point of P-256 Elliptic Curve, as described in [C. F. Kerry, "Digital signature standard (DSS)," National Institute of Standards and Technology, 2013.] which is incorporated herein by reference for all purposes in its entirety. The generator point G may be the same generator point used by the certificate authority 502 at step 510. The first ECC point Rm can be determined, for example, by computing Rm=km.G.

The generator point G may be a public value capable of being shared with other devices, such as the certificate authority 502. In some embodiments, the generator point G may be a part of a standard used by the certificate authority 502 which may be known and/or received by other devices (e.g., resource provider computers, communication devices, etc.). This step can be analogous to generating an ECC public key, however the first ECC point Rm isn't used as a public key. The first random value km can be retained by the resource provider computer 504 and not be disclosed to the certificate authority 502.

At step 530, after generating the certificate request values including the merchant identifier Mid and the first ECC point Rm, the resource provider computer 504 can transmit a certificate request message to the certificate authority 502. The certificate request message can comprise the certificate request values. The resource provider computer 504 may transmit the certificate request message to the certificate authority 502 in any suitable manner described herein.

At step 540, after receiving the certificate request message from the resource provider computer 504, the certificate authority 502 can generate a resource provider public key certificate, also referred to as a merchant public key certificate MCertificate. The certificate authority 502 can generate the resource provider public key certificate as described below and described in further detail in [section 3.4 of M. Campagna "*Standards for efficient cryptography, SEC 4: Elliptic Curve Qu-Vanstone Implicit Certificate Scheme (ECQV)*", Certicom Research, 2013].

For example, generating the resource provider public key certificate can include the following. The certificate authority 502 can generate a second random value kca, using any suitable method described herein. The second random value kca can be of any suitable length, for example, 256 bits. For example, if the P-256 curve is used, as described herein, each integer generated can be 256 bits. Additionally, the x and y coordinates of an ECC point can also be 256 bits. The certificate authority 502 can then determine a second ECC point Pm. The certificate authority 502 can determine the second ECC point Pm based on the first ECC point Rm, received in the certificate request message, the second random value kca, and the generator point G. The second ECC point Pm can be determined by computing Pm=Rm+(kca.G).

The certificate authority 502 can then determine the resource provider public key certificate, i.e., MCertificate. The resource provider public key certificate MCertificate can include the second ECC point Pm and the resource provider identifier Mid. In some embodiments, the resource provider public key certificate MCertificate can include any other suitable data, such as, for example, an expiration date of the certificate, an effective date of the certificate, a serial number of the certificate, a subject, an issuer, etc.

After determining the resource provider public key certificate MCertificate, the certificate authority 502 can determine a first hash value em of a hash of the resource provider public key certificate MCertificate. The hash can be any suitable cryptographic hash function. For example, to determine the first hash value em, the certificate authority 502 can compute em=Hash(Mcertificate). For the P-256 curve, a hash algorithm with a 32 byte output can be used, for example, SHA256 is suitable. Hashing to integers in modulo n is further described in [section 2.3 of M. Campagna "*Standards for efficient cryptography, SEC 4: Elliptic Curve Qu-Vanstone Implicit Certificate Scheme (ECQV)*", Certicom Research, 2013].

The certificate authority 502 can also determine a private key derivation value rm. The private key derivation value rm can be a value that can enable the resource provider computer 504 to determine a resource provider private key dmerch. The certificate authority 502 can determine the private key derivation value rm based on the first hash value em, the second random value kca, the certificate authority private key dca, and an order of the elliptic curve n. The order of the elliptic curve n can be a public value as described in [Appendix D.1.2.3 of C. F. Kerry, "Digital signature standard (DSS)," National Institute of Standards and Technology, 2013.]. For example, the certificate authority 502 can determine the private key derivation value rm by computing rm=(em.kca+dca)(mod(n)), where mod is the modulo operator. In some embodiments, the order of the elliptic curve n may be a value that is included in the standard of the certificate authority 502. The resource provider computer 504 may be capable of retrieving the value of the order of the elliptic curve n while retrieving the certificate authority public key Pca, described above.

At step 550, after determining the resource provider public key certificate Mcertificate as well as the private key derivation value rm, the certificate authority 502 can send a certificate response message to the resource provider computer 504. The certificate response message can comprise the resource provider public key certificate Mcertificate as well as the private key derivation value rm.

At step 560, after receiving the certificate response message, the resource provider computer 504 can determine a resource provider ECC key pair. Determining the resource provider ECC key pair can include the following operations. The resource provider computer 504 can determine the first hash value em of a hash of the resource provider public key certificate MCertificate. The hash function can be any suitable hash function as described herein. For example, to determine the first hash value em, the resource provider computer 504 can compute em=Hash(Mcertificate). In some embodiments, the hash function used by the resource provider computer 504 can be the same hash function used by the certificate authority 502, thus the first hash value em can be the same value determined by both the resource provider computer 504 and the certificate authority 502.

The resource provider computer 504 can then determine the resource provider private key dmerch based on the first hash value em, the first random value km, the private key derivation value rm, and the order of the elliptic curve n. For example, the resource provider computer 504 can determine the resource provider private key dmerch by computing dmerch=(em.km+rm)(mod(n)). The resource provider computer 504 can also determine a resource provider public key Pmerch based on the first hash value em, the second ECC point Pm included in the resource provider public key certificate Mcertificate, and the certificate authority public key Pca. Elements of step 560 are further described in [section 3.6 of M. Campagna "*Standards for efficient cryptography, SEC 4: Elliptic Curve Qu-Vanstone Implicit Certificate Scheme (ECQV)*", Certicom Research, 2013].

The resource provider computer 504 can store the resource provider public key certificate Mcertificate in any suitable manner described herein. Further, the resource provider computer 504 can securely store the resource provider public key Pmerch as well as the resource provider private key dmerch.

Figure 6:
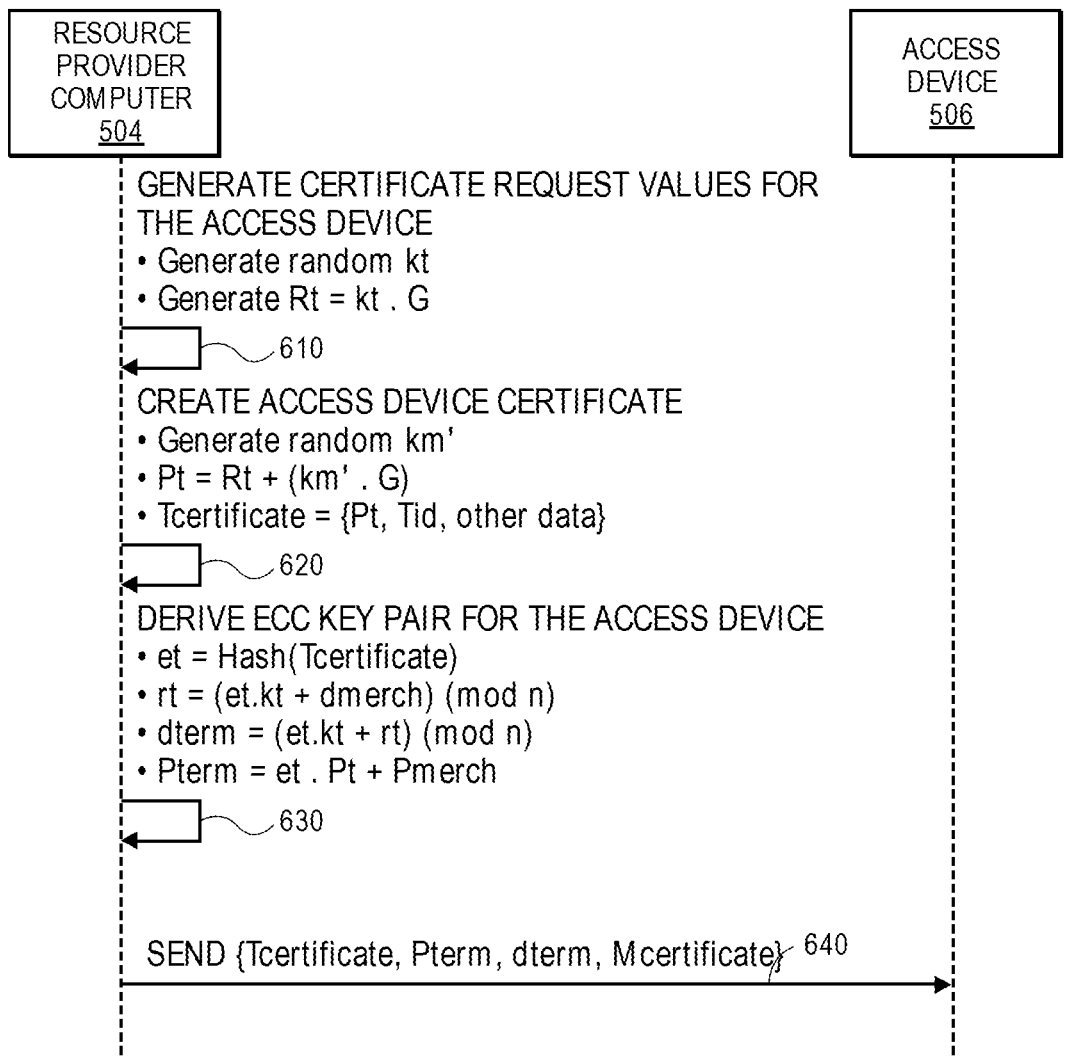
FIG. 6 shows a flow diagram illustrating an access device certificate and key pair generation process according to embodiments of the invention.

FIG. 6 shows a flowchart of an access device key pair and certificate generation method according to an embodiment of the invention. The method illustrated in FIG. 6 will be described in the context of a resource provider computer generating a certificate and key pair for an access device. Although the steps are illustrated in a specific order, it is understood that embodiments of the invention may include methods that have the steps in different orders. In addition, steps may be omitted or added and may still be within embodiments of the invention.

In FIG. 6, the resource provider computer 504 can act as a sub-certificate authority that can generate access device public key certificates as well as access device key pairs. The resource provider computer 504 can generate access device public key certificates for one or more access devices. In some embodiments, the generated access device certificates can have expiration dates. When expired, the corresponding access device can request a new certificate and key from the resource provider computer 504. In other embodiments, the resource provider computer 504 may store each generated certificate and key pair in a database and may generate new certificates and key pairs as keys and certificates expire.

Before step 610, the resource provider computer 504 can generate and/or receive a certified ECC key pair, for example, a resource provider public key Pmerch and a resource provider private key dmerch as described in FIG. 5. The resource provider computer 504 can be capable of creating $2^{nd}$ level certificates for one or more access devices, such as the access device 506, associated with the resource provider computer 504.

At step 610, the resource provider computer 504 can generate a random value kt as well as a first ECC point Rt. The random value kt can be any suitable value and may be generated using random and/or pseudorandom number generator(s). The first ECC point Rt can be generated, for example, by computing Rt=kt.G, where the first ECC point Rt is determined based on the random value kt and a generator point G. The generator point G may be the same generator point G as described in FIG. 5.

In this example, the resource provider computer 504 can generate the random value kt and the first ECC point Rt on behalf of the access device 506. However, it is understood that in other embodiments, the access device 506 can generate the random value kt and the first ECC point Rt and then transmit the random value kt and the first ECC point Rt to the resource provider computer 504 in a certificate request message.

At step 620, the resource provider computer 504 can create an access device public key certificate, also referred to as a terminal public key certificate TCertificate, using ECQV techniques as described herein. For example, during step 620, the resource provider computer 504 can first generate a random value km'. The resource provider computer 504 can then determine a second ECC point Pt based on the first ECC point Rt, the random value km', and the generator point G. For example, the second ECC point Pt can be determined by computing Pt=Rt+(km'.G).

The resource provider computer 504 can then determine the access device public key certificate, i.e., TCertificate. The access device public key certificate TCertificate can include the second ECC point Pt and an access device identifier Tid. In some embodiments, the access device public key certificate TCertificate can include any other suitable data, such as, for example, an expiration date of the TCertificate, an effective date of the TCertificate, etc. The access device identifier Tid can be any suitable identifier used to identify the access device 506. In some embodiments, the resource provider computer 504 may store a list of access device identifiers corresponding to access devices associated with and/or operated by the resource provider.

At step 630, after creating the access device public key certificate TCertificate, the resource provider computer 504 can derive an access device key pair for the access device 506. For example, determining the access device key pair can include the following operations. The resource provider computer 504 can determine a first hash value et of a hash function performed on the access device public key certificate TCertificate. The hash function can be any suitable hash function as described herein. For example, to determine the first hash value et, the resource provider computer 504 can compute et=Hash(Tcertificate).

After determining the first hash value et, the resource provider computer 504 can generate a private key derivation value rt based on the first hash value et, the random value kt, the resource provider private key dmerch, and an order of the elliptic curve n. For example, the resource provider computer 504 can compute rt=(et.kt+dmerch)(mod(n)), where mod is the modulo operator.

The resource provider computer 504 can then determine the access device private key dterm. The resource provider computer 504 can determine the access device private key dterm based on the first hash value et, the random value kt, the private key derivation value rt, and the order of the elliptic curve n. For example, the resource provider computer 504 can determine the access device private key dterm by computing dterm=(et.kt+rt)(mod(n)).

The resource provider computer 504 can also determine an access device public key Pterm based on the first hash value et, the second ECC point Pt, and the resource provider public key Pmerch. Elements of step 630 are further described in [section 3.6 of M. Campagna "*Standards for efficient cryptography, SEC* 4: *Elliptic Curve Qu-Vanstone Implicit Certificate Scheme (ECQV)*", Certicom Research, 2013].

At step 640, the resource provider computer 504 can then transmit the access device public key certificate TCertificate, the access device public key Pterm, and the access device private key dterm to the access device 506. The resource provider computer 504 can have an access device management system that can enable the resource provider computer 504 to transmit this data securely, e.g., authenticated & with confidentiality & integrity. In some embodiments, the resource provider computer 504 may also transmit the resource provider public key certificate MCertificate to the access device 506.

In other embodiments, the access device 506 can receive the access device public key Pterm from the resource provider computer 504 after the resource provider computer 504 determines the access device public key Pterm.

After step 640, the access device 506 can store the access device certificate TCertificate and the resource provider certificate MCertificate. The access device 506 can also store the access device private key dterm and the access device public key Pterm.

Further, in some embodiments, the resource provider computer 504 can create more than one access device certificate for more than one access device. For example, the resource provider computer 504 can manage more than one access device and may create an access device certificate for each of the managed access devices.

Figure 7A:
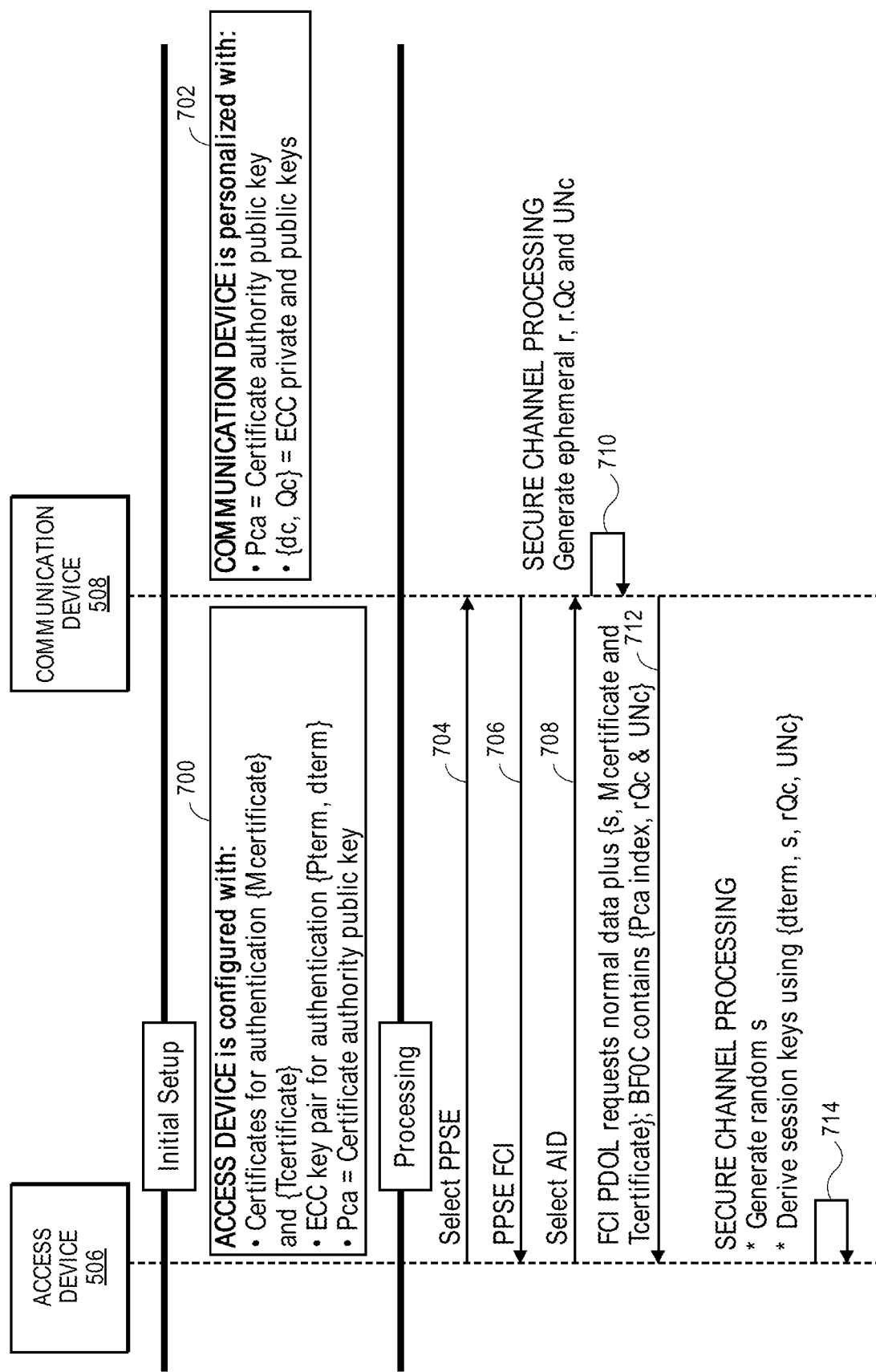
FIG. 7A shows a flow diagram illustrating a secure interaction process between a communication device and an access device according to embodiments of the invention.
Figure 7B:
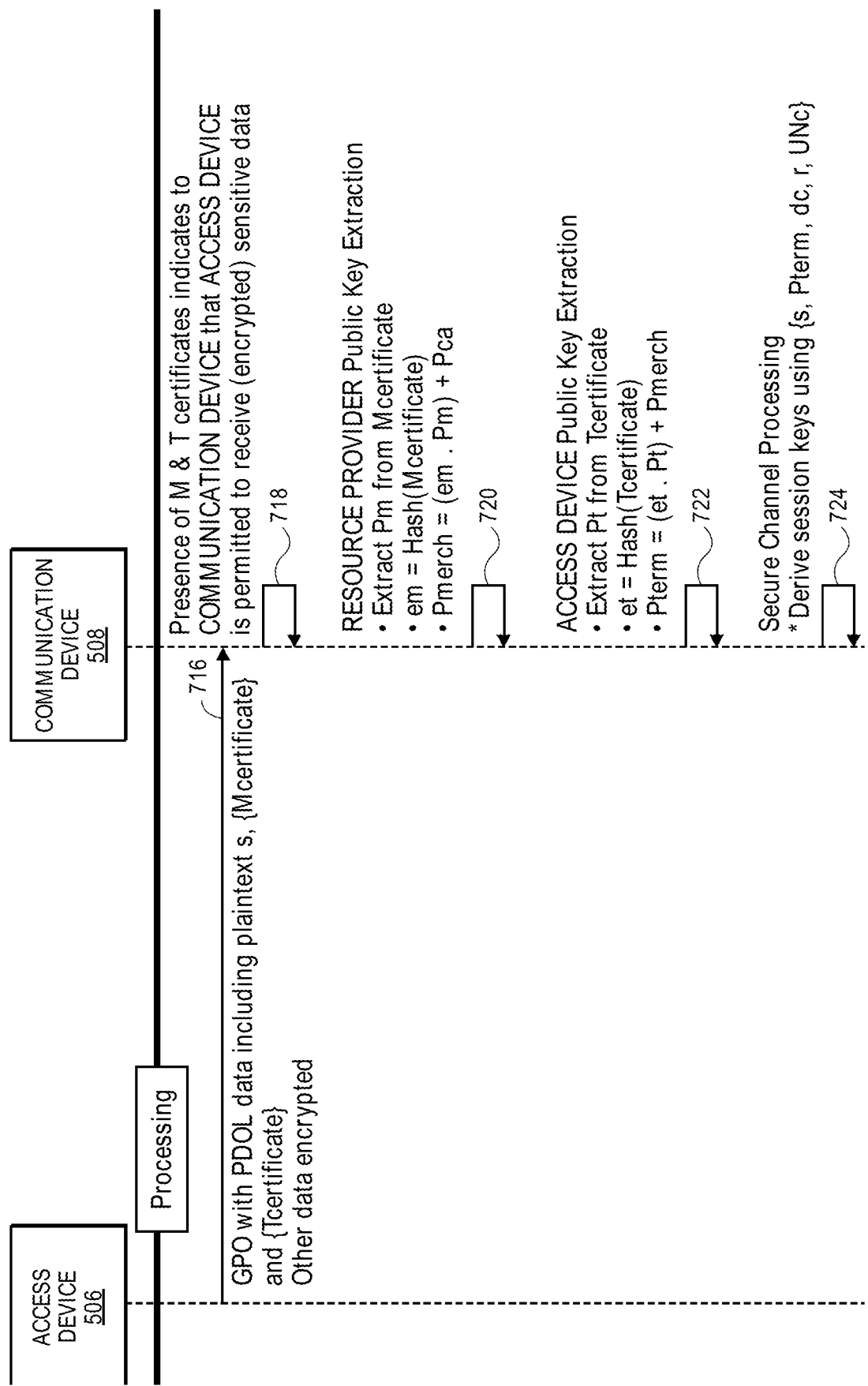
FIG. 7B shows a flow diagram illustrating a secure interaction process between a communication device and an access device according to embodiments of the invention.
Figure 7C:
FIG. 7C shows a flow diagram illustrating a secure interaction process between a communication device and an access device according to embodiments of the invention.

FIGS. 7A-C show a flowchart of an interaction processing method according to an embodiment of the invention. The method illustrated in FIGS. 7A-C will be described in the context of a communication device performing an interaction with an access device. Although the steps are illustrated in a specific order, it is understood that embodiments of the invention may include methods that have the steps in different orders. In addition, steps may be omitted or added and may still be within embodiments of the invention.

The steps in FIGS. 7A-C may occur when a communication device 508 is presented to the access device 506 during an interaction, such as a transaction. Some embodiments of the invention can include a quick Visa Smart Debit/Credit (qVSDC) protocol.

Before the access device 506 and the communication device 508 are brought into communication range, an initial setup phase may be performed. The initial setup phase can include steps 700-702. After the initial setup phase, when the access device 506 and the communication device 508 are brought into communication range, a processing phase may be performed. The processing phase can include steps 704-740.

At step 700, the access device 506 can be configured with certificates (e.g., ECQV certificates) for access device authentication. The certificates can include an access device public key certificate Tcertificate and a resource provider public key certificate Mcertificate, which may be received from the resource provider computer 504, as described above in FIG. 6. The access device 506 can also be configured with an access device key pair comprising an access device public key Pterm and an access device private key dterm. In some embodiments, the access device 506 can be configured with a CA public key certificate of the certificate authority 502. For example, the access device 506 may receive the CA public key certificate from the resource provider computer 504.

At step 702, the communication device 508 can be configured with a CA public key Pca. The communication device 508 can also be configured with a communication device public/private key pair comprising a communication device public key Qc and a communication device private key dc. In some embodiments, the CA public key Pca, the communication device public key Qc, and/or the communication device private key dc may be stored on the communication device 508 during manufacturing of the communication device 508. In other embodiments, the CA public key Pca, the communication device public key Qc, and/or the communication device private key dc may be provisioned to the communication device 508 periodically, for example, once per day, once per week, twice per month, etc. In some embodiments, the communication device 508 can be further configured with a CA public key certificate of the certificate authority 502.

At step 704, after the initial setup phase and after a communication device 508 is detected (e.g., in communication range), the access device 506 can transmit a select command to the communication device 508. The select command may be a select proximity payment system environment (PPSE) command, which can be used to identify the payment environment supported by the access device 506 and the communication device 508. The PPSE command may also include information regarding which payment application(s) (e.g., a list of application identifiers (AID(s))) may be available on the communication device 508.

At step 706, upon receiving the select command from the access device 506, the communication device 508 can respond to the select command with a select response (i.e., an available applications response). For example, the communication device 508 may include an application which may identify and process the request by recognizing the payment environment identifier (e.g., PPSE name) included in the request, and respond by sending an available applications response back to the access device 506. The available applications response may include a list of available AIDs, and may include the payment environment identifier (e.g., PPSE name). In some embodiments, the available applications response may be in the form of a select PPSE response and may include PPSE file control information (FCI).

At step 708, after receiving the select response (i.e., the PPSE FCI), the access device 506 can transmit a select AID request to the communication device 508. The select AID request can request the communication device 508 to select a payment application. For example, when the access device 506 receives the available applications response, the access device 506 can select a suitable application from the list of applications received in the available applications response (e.g., by selecting an AID from the available AID(s) received in the available application(s) response). In some cases, the selected AID can be the highest priority AID available that is supported by access device 506. The access device 506 may send an application selection with the selected AID to the application on the communication device 508 in the form of the select AID request.

At step 710, after receiving the select AID request from the access device 506, the communication device 508 can begin to execute the application corresponding to the AID selected by the access device 506. For example, the selected AID may be an application such as a payment application. The payment application can generate a blinding factor r, an ephemeral blinded public key rQc, and an unpredictable number UNc. The blinding factor r can be a random value generated using a random number generator(s) and/or a pseudorandom number generator(s). The blinding factor can be in any suitable range, for example, in the range $(0,1)^\kappa$, where $\kappa$ can be a security parameter that causes a suitable number of random bits to be generated (e.g., 256 bits for the curve P-256).

The communication device 508 can create the ephemeral blinded public key rQc by blinding the communication device public key Qc with the blinding factor r. The communication device public key Qc can be blinded using ECC and/or RSA blinding techniques. Further, the unpredictable number UNc may be created in any suitable manner, as described herein. For example, the unpredictable number UNc may be randomly generated. In some embodiments, the unpredictable number UNc may be the result of a process performed on the communication device 508.

At step 712, the communication device 508 can send a select AID response to the access device 506. In some embodiments, the select AID response may include AID file control information (FCI) with the selected AID as a dedicated file name. The select AID response may include a list of transaction data identifiers to request the appropriate data from the access device 506, and the list of transaction data identifiers can be in the form of a processing options data object list (PDOL). The transaction data requested by the application on the communication device 102 may include terminal transaction qualifiers (TTQ), an authorized amount, other amount, terminal country code, terminal verification results, transaction currency code, transaction data, transaction type, and/or an unpredictable number. The select AID response may also include other data such as the FCI issuer discretionary data, application program identifier, and language preference.

The select AID response can further contain a request for a random value s, the access device public key certificate Tcertificate, and the resource provider public key certificate Mcertificate. For example, the request may be {s, Tcertificate, Mcertificate}. Additionally the file control information (FCI) can include a BFOC tag and may include discretionary data such as, but not limited to, a Pca index, the ephemeral blinded public key rQc, and the unpredictable number UNc. The Pca index may be a certificate authority public key index which may identify the certificate authority's public key. In some embodiments, the access device 506 can evaluate the Pca index to determine whether or not the access device 506 and the communication device 508 are associated with the same certificate authority.

In some embodiments, the access device 506 may receive the communication device public key Qc. In other embodiments, the access device 506 may receive the ephemeral blinded public key rQc, also referred to as a blinded public key.

At step 714, the presence of the request including {s, Tcertificate, Mcertificate} in the select AID response, in addition to the presence of the ephemeral blinded public key rQc and the unpredictable number UNc can indicate to the access device 506 that the communication device 508 supports the processing capability for terminal authentication. For example, the access device 506 can be capable of evaluating the select AID response and can determine whether or not the select AID response comprises the request {s, Tcertificate, Mcertificate}. The access device 506 can also determine whether or not the select AID response comprises the ephemeral blinded public key rQc and the unpredictable number UNc.

If the access device 506 determines that it has received the request {s, Tcertificate, Mcertificate}, the ephemeral blinded public key rQc, and the unpredictable number UNc, the access device 506 can generate the random value s in any suitable manner described herein. The access device 506 can also derive a first session key using a key derivation function. The inputs to the key derivation function can include the random value s, the access device private key dterm, the ephemeral blinded public key rQc, and the unpredictable number UNc. The output of the key derivation function can be a first session key.

In other embodiments, the access device 506 can determine a first session key using the access device private key dterm and the communication device public key Qc.

The derivation of the first session key can make use of Diffie-Hellman techniques. Diffie-Hellman is a way of generating a shared secret between two people in such a way that the secret can't be seen, or determined, by observing the communication. The shared secret can then be used to determine an encryption key, a first or second session key in this case. This is beneficial since an eavesdropper cannot determine the shared secret even if the messages between the access device and the communication device were recorded and later analyzed. For further detail on Diffie-Hellman techniques see at least [Diffie, W., and Hellman, M. *New directions in cryptography. IEEE Trans. Inform. Theory* IT-22, 6 (November 1976), 644-654] which is incorporated herein by reference for all purposes in its entirety. Furthermore, the key derivation function can be any suitable key derivation function as known by one of ordinary skill in the art. For example, the key derivation function may be an HMAC (hash-based message authentication code)-based KDF such as HKDF as described in [Krawczyk, Hugo "*Cryptographic Extraction and Key Derivation: The HKDF Scheme*", Cryptology ePrint Archive. International Association for Cryptologic Research, (2010).], which is incorporated herein by reference for all purposes in its entirety.

Now referring to FIG. 7B, at step 716, after generating the first session key, the access device 506 can create a get processing options (GPO) request comprising the random value s, the access device public key certificate Tcertificate, and the resource provider public key certificate Mcertificate. The GPO request can further include the access device transaction data requested by the communication device 508 in the select AID response. In some embodiments, the GPO request may include the requested terminal transaction data in a processing options data object list (PDOL). In some embodiments, the terminal transaction data (e.g., terminal transaction qualifiers (TTQ)) may include a transaction type indicator indicating whether access device 506 supports integrated chip based transactions or magnetic stripe based transactions. Thus, the access device 506 may send a transaction type indicator in the terminal transaction data to indicate that access device 506 supports integrated chip based transactions. In some embodiments, the terminal transaction data (e.g., terminal transaction qualifiers (TTQ)) may also include a consumer verification method (CVM) requirement indicator to indicate whether a CVM is required by access device 506, and also CVM type indicators indicating the types of CVM supported by access device 506. Examples of CVMs that may be supported by access device 506 can include online personal identification number (PIN), signature, and/or consumer device CVM (CDCVM) such as a passcode used on communication device 508.

In some embodiments, the access device 506 can transmit the resource provider certificate Mcertificate and the access device certificate Tcertificate to the communication device 508. A secure channel can then be established between the access device 506 and the communication device 508. For example, the access device 506 can determine the first session key, as described above, and the communication device 508 can determine a second session key, described in further detail below. The first session key and the second session key may be the same and may be used to establish a secure channel between the access device 506 and the communication device 508.

The access device 506 can encrypt the transaction data in the GPO request using the first session key. Encrypting the access device transaction data at this point can protect against malicious manipulation of indicators such as terminal transaction qualifiers, which are used by the access device 506 to indicate, for example, whether cardholder verification is required. After encrypting the data in the GPO request, the access device 506 can transmit the GPO request to the communication device 508. In some embodiments, the random value s, the access device public key certificate Tcertificate, and the resource provider public key certificate Mcertificate can be transmitted as plaintext data. Thus, the communication device 508 may have access to s, Tcertificate, and Mcertificate which, as described herein, the communication device 508 may use to derive a second session key to decrypt the transaction data and/or further communications with the access device 506.

At step 718, after receiving the GPO request from the access device 506, the communication device 508 can determine if the access device public key certificate Tcertificate and the resource provider public key certificate Mcertificate are included in the GPO request. If the communication device 508 determines that either the access device public key certificate Tcertificate and/or the resource provider public key certificate Mcertificate are not included in the GPO request, the communication device 508 can terminate communication with the access device 506, or in other embodiments, may revert to processing suitable for an access device that does not support encrypted communications.

If the communication device 508 determines that the access device public key certificate Tcertificate and the resource provider public key certificate Mcertificate are both included in the GPO request, then the communication device 508 can determine to proceed to step 720.

At step 720, the communication device 508 can determine a resource provider public key Pmerch using data in the resource provider public key certificate Mcertificate and using the CA public key Pca. The data in the resource provider public key certificate can include an ECC point Pm.

For example, in some embodiments, determined the resource provider public key Pmerch can include the following. The communication device 508 can decode the resource provider public key certificate Mcertificate, according to certificate decoding methods and rules, to determine an octet string, which can be converted to a point using Octet-String-to-Elliptic-Curve-Point conversion. The communication device 508 can then determine a result of a hash of the resource provider public key certificate Mcertificate. The communication device 508 can then determine the resource provider public key Pmerch using the result of the hash function, the point Pm, and the CA pubic key Pca. Further details of the determination of the resource provider public key Pmerch are described in [section 3.5 of M. Campagna "*Standards for efficient cryptography, SEC 4: Elliptic Curve Qu-Vanstone Implicit Certificate Scheme (ECQV)*", Certicom Research, 2013].

In some embodiments, the communication device 508 can extract data from the resource provider public key certificate Mcertificate, such as the ECC point Pm. The communication device 508 can then determine a hash value em of a hash of the resource provider public key certificate Mcertificate, as described herein. The communication device 508 can then determine the resource provider public key Pmerch using the hash value em, the ECC point Pm, and the CA public key Pca, for example by computing Pmerch=(em.Pm)+Pca.

At step 722, after determining the resource provider public key Pmerch, the communication device 508 can determine an access device public key Pterm using data in the access device public key certificate Tcertificate and the resource provider public key Pmerch. The data in the access device public key certificate Tcertificate can include an ECC point Pt. For example, the communication device 508 can decode the access device public key certificate Tcertificate, according to certificate decoding methods and rules, to determine an octet string, which can be converted to a point using an Octet-String-to-Elliptic-Curve-Point conversion. The communication device 508 can then determine a result of a hash of the access device public key certificate Tcertificate. The communication device 508 can then determine the access device public key Pterm using the result of the hash function, the point Pt, and the resource provider public key Pmerch. Further details of the processing in this step are described in [section 3.5 of M. Campagna "*Standards for efficient cryptography, SEC 4: Elliptic Curve Qu-Vanstone Implicit Certificate Scheme (ECQV)*", Certicom Research, 2013].

In some embodiments, the communication device 508 can extract data from the access device public key certificate Tcertificate, such as the ECC point Pt. The communication device 508 can then determine a hash value et of a hash of the resource provider public key certificate Tcertificate, as described herein. The communication device 508 can then determine the access device public key Pterm using the hash value et, the ECC point Pt, and the resource provider public key Pmerch, for example by computing Pterm=(et.Pt)+Pmerch.

At step 724, the communication device 508 can derive a second session key using the key derivation function (KDF), as described herein. The input to the key derivation function can be the random value s (received in the GPO request from the access device 506), the access device public key Pterm, the communication device private key dc, the blinding factor r, and the unpredictable number UNc. The KDF may be the same KDF as used by the access device 506 to determine the first session key, described above, for example at step 714.

If all input data elements to the KDF are expanded, it can be seen that the input data to derive the second session key is the same as the input data to derive the first session key that was used by the access device 506 in step 714. Consequently, the first session key is equivalent to the second session key due to Elliptic-Curve Diffie-Hellman techniques.

To demonstrate this, the access device 506 generated the first session key based on the random value s, the access device private key dterm, the ephemeral blinded public key rQc, and the unpredictable number UNc. The ephemeral blinded public key rQc was created with the blinding factor r and the communication device public key Qc which is an elliptic curve point: Qc=dc.G, where dc is the communication device private key and where G is the generator point for the curve. Thus, the first session key is generated using the input data: {s, dterm, r, dc, G, UNc}.

The communication device 508 generated the second session key based on the random value s and the access device public key Pterm which is an elliptic curve point: Pterm=dterm.G, where dterm is the access device private key and where G is the generator point for the curve, as well as the communication device private key dc, the blinding factor r, and the unpredictable number UNc. Thus, the second session key is generated using the input data: {s, dterm, r, dc, G, UNc}. Therefore, the first session key and the second session key are the same, thereby allowing the access device 506 and the communication device 508 to securely communicate.

The access device 506 and the communication device 508 can establish the secure channel between the access device 506 and the communication device 508 using data from the resource provider certificate and the access device certificate. For example, the communication device 508 can derive the second session key using the access device public key and a communication device private key, wherein the first session key is used to form the secure channel. After establishing the secure channel the access device 506 can transmit data to the communication device 508 and/or receive data from the communication device 508 using the secure channel. In some embodiments, the access device 506 and the communication device 508 form the secure channel without authenticating each other. For example, the access device 506 does not need to transmit an authentication request message to the communication device 508 and wait for an authentication response message from the communication device 508 prior to transmitting encrypted data in an established secure channel to the communication device 508. Likewise, the communication device 508 does not need to transmit and receive authentication request and response messages to and from the access device 506 prior to communication via the secure channel. Next, the data transmitted and/or received after establishing the secure channel will be discussed.

Now referring to FIG. 7C, at step 726, after generating the second session key, the communication device 508 can generate response data in response to the GPO request. The communication device 508 can generate dynamic transaction processing information using at least some of the received access device transaction data, and can transmit a set of transaction processing information including the generated dynamic transaction processing information to access device 506. In some embodiments, the transaction processing information can be sent in the form of a GPO response. In some embodiments, the transaction processing information may include one or more application file locators (AFLs) that can be used as file address(es) by access device 506 to read account data stored on communication device 508, and an application interchange profile (AIP) that can be used to indicate the capabilities of the application. The communication device 508 can encrypt the GPO response with the second session key.

At step 728, the communication device 508 can transmit the GPO response comprising the encrypted data to the access device 506, the encrypted data being encrypted with the second session key. At step 730, after receiving the GPO response, the access device 506, which has already derived the first session key in step 714, can decrypt the encrypted data received in the GPO response from the communication device 508.

After the access device 506 decrypts the transaction processing information, the access device 506 may send an account data request to the application of the communication device 508 to read additional account data that may be stored on the communication device 508. In some embodiments, the account data request may be in the form of a read record command, and may include indicators of the address(es) or location(s) of the account data that the access device 506 is attempting to read. The indicators included in the account data request may correspond to an AFL in the transaction processing information provided from the communication device 508. At step 732, the access device 506 can issue one or more read record commands to the communication device 508.

At step 734, in response to receiving the read record command(s) from the access device 506, the communication device 508 can encrypt record data with the second session key. In some embodiments, the record data can include account data. The account data may include, for example, application usage control that indicates the issuer's restrictions on the usage and services allowed for the application, the cardholder's name, account number, payment token, customer exclusive data, issuer country code, token requester ID (e.g., if a token is used), and/or other account related data that is accessible at the AFL location. At step 736, after encrypting the record data with the second session key, the communication device 508 can transmit the encrypted record data to the access device 506. In some embodiments, the communication device 508 can include the blinding factor r and the communication device public key Qc in the response.

At step 738, after receiving the encrypted record data, the access device 506 can decrypt the encrypted record data with the first session key, yielding the record data. At step 740, when the record data has been received and decrypted, the access device 506 can use certificates (e.g., a communication device certificate) and other data provided by the communication device 508 to verify the secure channel. The data elements used to verify the secure channel can include: 1) the ephemeral blinded public key rQc (received by the access device 506 in step 712); 2) the blinding factor r (received by the access device 506 in the GPO response at step 728 and/or the record data at step 736); and 3) the communication device public key Qc (received by the access device 506 in the record data at step 736).

Verification can involve the access device 506 verifying that the ephemeral blinded public key rQc is equal to the communication device public key Qc blinded with the blinding factor r (i.e., rQc=r.Qc), thereby demonstrating that the data received from the communication device 508 originates from the device (i.e., the communication device 508) that has the communication device private key dc corresponding the communication device public key included in the communication device public key certificate. Note that steps 738 and 740 can occur after the communication device 508 has been removed from the vicinity (i.e., communication range) of the access device 506.

For example, in some embodiments, the access device 506 can receive the communication device public key Qc and the blinding factor r. The access device 506 can then verify that the blinded public key (i.e., the ephemeral blinded public key rQc) is equal to the communication device public key Qc blinded with the blinding factor r.

In some embodiments the access device 506 can receive one or more public key certificates from the communication device 508. The access can use suitable certificate verification techniques (including ECC based techniques such as ECDSA, ECSDSA or ECQV, or RSA based techniques) to authenticate the communication device public key (e.g., Qc). This step can provide assurance to the access device 506 that the data from the communication device 508 is provided by a genuine device.

For example, the communication device 508 can provide at least one public key certificate(s) (i.e., a communication device public key certificate, a certificate authority public key certificate, etc.) to the access device 506. After receiving the at least one public key certificate(s), the access device 506 can verify the at least one public key certificate(s) in any suitable manner described herein.

Once the access device 506 has received the requisite data (i.e., record data) from the transaction processing information and/or one or more account data transmissions, some or all of the data elements in the transaction processing information and/or one or more account data transmissions can be used by access device 506 to generate a transaction authorization request message to request authorization of the transaction from the issuer.

As another example, in reference to FIG. 1, a transaction processing system can include a communication device with access data. A communication device 102 can be operated by a user. The user may use the communication device 102 to pay for a good or service at a resource provider such as a merchant. The resource provider may operate a resource provider computer 106 and/or an access device 104. The resource provider may communicate with an authorization computer 114 (e.g., an issuer computer) via a transport computer 110 (e.g., an acquirer computer) and a processing network 112 (e.g., a payment processing network).

The processing network 112 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow using a communication device 102 at an access device 104 (e.g. POS location) can be described as follows. A user presents their communication device 102 to an access device 104 to pay for an item or service. The communication device 102 and the access device 104 can interact such that access data from the communication device 102 (e.g., PAN, a payment token, verification value(s), expiration date, etc.) is received by the access device 104 (e.g., via contact or contactless interface). As noted above, the communication device 102 and the access device 104 may generate session keys. The communication device 102 may transmit data encrypted with a second session key to the access device 104. The access device 104 may be capable of decrypting the received encrypted data if the access device 104 is honest, i.e., the access device 104 has supplied the communication device 102 with a valid resource provider public key certificate and a valid access device public key certificate. If the access device 104 is an honest access device, then the access device 104 may be capable of generating the correct session key capable of decrypting the encrypted data and can then transmit information to the resource provider computer 106.

The resource provider computer 106 may then receive this information (i.e., access data) from the access device 104 via an external communication interface. The resource provider computer 106 may then generate an authorization request message that includes the information received from the access device 104 (i.e., information corresponding to the communication device 102) along with additional transaction information (e.g., a transaction amount, merchant specific information, etc.) and electronically transmits this information to a transport computer 110. The transport computer 110 may then receive, process, and forward the authorization request message to a processing network 112 for authorization.

In general, prior to the occurrence of a credit or debit-card transaction, the processing network 112 has an established protocol with each authorization computer on how the issuer's transactions are to be authorized. The processing network 112 may receive the authorization request message, determine the issuer associated with the communication device 102, and forward the authorization request message for the transaction to the authorization computer 114 for verification and authorization. Once the transaction is authorized, the authorization computer 114 may generate an authorization response message (that may include an authorization code indicating the transaction is approved or declined) and transmit this electronic message via its external communication interface to the processing network 112. The processing network 112 may then forward the authorization response message to the transport computer 110, which in turn may then transmit the electronic message (e.g., the authorization response message) comprising the authorization indication to the resource provider computer 106, and then to the access device 104.

At the end of the day or at some other suitable time interval, a clearing and settlement process between the resource provider computer 106, the transport computer 110, the processing network 112, and the authorization computer 114 may be performed on the transaction.

Embodiments of the invention have a number of advantages. For example, the communication device can transmit data encrypted with a second session key to the access device without authenticating the identity of the access device. The transmitted encrypted data can be secure from a malicious access device, but can be decrypted by an honest access device. Thus, embodiments of the invention are more efficient than systems where the communication device and access device must first authenticate before transmitting sensitive encrypted data.

Further, embodiments allow for the access device to verify the public key and ephemeral blinded public key of the communication device after receiving the encrypted data. In this way, verification may be performed by the access device without additional messages strictly for authentication. Additionally, embodiments of the invention allow for efficient implicit authentication between access devices and communication devices since the devices do not need to send additional message strictly for authentication as well as the employment of ECQV certificates which can save 64 bytes compared to other certificate schemes, thus allowing for quick interactions between devices.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   transmitting, by an access device to a communication device, a resource provider certificate and an access device certificate;
   establishing a secure channel between the access device and the communication device using data from the resource provider certificate and the access device certificate; and
   transmitting to or receiving data from the communication device using the secure channel,
   wherein before the secure channel is established, the communication device:
   determines a resource provider public key using data in the resource provider certificate and a certificate authority public key;
   determines an access device public key using data in the access device certificate and the resource provider public key; and
   derives a first session key using the access device public key and a communication device private key, wherein the first session key is used to form the secure channel.

2. The method of claim 1, further comprising:
   receiving, by the access device, a communication device public key; and
   determining a second session key corresponding to the first session key using an access device private key and the communication device public key.

3. The method of claim 2, wherein the communication device public key is a blinded public key.

4. The method of claim 3, wherein the first and second session key are also each determined using an unpredictable number and a random number.

5. The method of claim 3, wherein after the secure channel is established, the method further comprises:
   receiving, by the access device, the communication device public key and a blinding factor; and
   verifying, by the access device, that the blinded public key is equal to the communication device public key blinded with the blinding factor.

6. The method of claim 1, further comprising:
   receiving, by the access device from a resource provider computer, the resource provider certificate and the access device certificate.

7. The method of claim 6, wherein the resource provider certificate was received from a certificate authority computer, before the resource provider certificate was received by the access device.

8. The method of claim 1, wherein the access device and the communication device form the secure channel without authenticating each other.

9. The method of claim 1 further comprising:
   receiving, by the access device, at least one certificate from the communication device; and
   verifying, by the access device, the least one certificate, thereby verifying the authenticity of data received from the communication device.

10. An access device comprising:
    a processor;
    a memory device; and
    a computer-readable medium coupled to the processor, the computer-readable medium comprising code executable by the processor for implementing a method comprising:
    transmitting, to a communication device, a resource provider certificate and an access device certificate;
    establishing a secure channel between the access device and the communication device using data from the resource provider certificate and the access device certificate; and
    transmitting to or receiving data from the communication device using the secure channel,
    wherein before the secure channel is established, the communication device:
    determines a resource provider public key using data in the resource provider certificate and a certificate authority public key;
    determines an access device public key using data in the access device certificate and the resource provider public key; and
    derives a first session key using the access device public key and a communication device private key, wherein the first session key is used to form the secure channel.

11. A method comprising:
receiving, by a communication device from an access device, a resource provider certificate and an access device certificate;
establishing a secure channel between the access device and the communication device using data from the resource provider certificate and the access device certificate; and
transmitting to or receiving data from the access device using the secure channel,
wherein before the secure channel is established, the method further comprises:
determining, by the communication device, a resource provider public key using data in the resource provider certificate and a certificate authority public key;
determining, by the communication device, an access device public key using data in the access device certificate and the resource provider public key; and
deriving, by the communication device, a first session key using the access device public key and a communication device private key, wherein the first session key is used to form the secure channel.

12. The method of claim 11, wherein before the secure channel is established, the access device:
receives a communication device public key; and
determines a second session key corresponding to the first session key using an access device private key and the communication device public key.

13. The method of claim 12, wherein the communication device public key is a blinded public key.

14. The method of claim 13, wherein the first and second session key are also each determined using an unpredictable number and a random number.

15. The method of claim 11, wherein the access device:
receives, from a resource provider computer, the resource provider certificate and the access device certificate.

16. The method of claim 11, wherein the access device and the communication device form the secure channel without authenticating each other.

17. The method of claim 11 further comprising:
providing, by the communication device, at least one certificate to the access device, wherein the access device:
verifies the at least one certificate, thereby verifying the authenticity of data received from the communication device.

18. The method of claim 11, wherein the communication device is a mobile phone.

\* \* \* \* \*